United States Patent
Cho et al.

(10) Patent No.: US 6,731,089 B2
(45) Date of Patent: May 4, 2004

(54) FLEXIBLE AND COMPACT MOTOR CONTROL MODULE BASED ON THE CAN COMMUNICATION NETWORK

(75) Inventors: Young Jo Cho, Sungnam (KR); Sung On Lee, Seoul (KR); Bum Jae You, Seoul (KR); Sang Rok Oh, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 0 days.

(21) Appl. No.: 09/996,915

(22) Filed: Nov. 30, 2001

(65) Prior Publication Data

US 2002/0091469 A1 Jul. 11, 2002

(30) Foreign Application Priority Data

Dec. 15, 2000 (KR) .......................................... 2000-77153

(51) Int. Cl.[7] .......................... G05B 11/01; G05B 11/32; H02P 7/67; G06F 7/00
(52) U.S. Cl. ........................ 318/560; 318/503; 318/625; 318/49; 701/36
(58) Field of Search ........................... 318/560, 34, 255, 318/563, 625; 701/36

(56) References Cited

U.S. PATENT DOCUMENTS

| | | | | |
|---|---|---|---|---|
| 4,825,133 A | * | 4/1989 | Tanuma et al. | 318/113 |
| 4,933,613 A | * | 6/1990 | Berner et al. | 318/65 |
| 5,386,185 A | * | 1/1995 | Beck et al. | 318/762 |
| 5,619,111 A | * | 4/1997 | Katagiri et al. | 318/625 |
| 5,689,161 A | * | 11/1997 | Fugere et al. | 318/563 |
| 6,037,738 A | * | 3/2000 | Morita et al. | 318/625 |
| 6,115,831 A | * | 9/2000 | Hanf et al. | 714/43 |
| 6,194,856 B1 | * | 2/2001 | Kobayashi et al. | 318/432 |
| 6,297,610 B1 | * | 10/2001 | Bauer et al. | 318/562 |
| 6,467,039 B1 | * | 10/2002 | Fredriksson | 713/151 |

* cited by examiner

*Primary Examiner*—Robert Nappi
*Assistant Examiner*—Patrick Miller
(74) *Attorney, Agent, or Firm*—Greenblum & Bernstein, P.L.C.

(57) ABSTRACT

The present invention relates to a flexible and compact motor control module based on the Controller Area Network (CAN) communication network. More specifically, the present invention relates to a motor control module which is based on the ISO11898 standard Controller Area Network (CAN), recognized for its suitability in the communication of intelligent sensors and actuators, and also capable of obtaining the location, speed and torque control commands of a motor and executing digital control functions irrespective of motor's type and power consumption, transmitting feedback data.

12 Claims, 4 Drawing Sheets

J1

| Left | Pin | Pin | Right |
|---|---|---|---|
| CAN_VCC | 1 | 2 | CAN_VCC |
| ADC00 | 3 | 4 | ADC07 |
| ADC01 | 5 | 6 | ADC06 |
| ADC02 | 7 | 8 | ADC05 |
| ADC03 | 9 | 10 | ADC04 |
| MOT_GND | 11 | 12 | MOT_GND |
| NOC | 13 | 14 | NOC |
| VCC | 15 | 16 | VCC |
| Ch1_PhA | 17 | 18 | Ch2_PhA |
| Ch1_PhB | 19 | 20 | Ch2_PhB |
| Ch1_Din1 | 21 | 22 | Ch2_Din1 |
| Ch1_Din2 | 23 | 24 | Ch2_Din2 |
| Ch1_Din3 | 25 | 26 | Ch3_Din3 |
| Ch1_PWM | 27 | 28 | Ch2_PWM |
| Ch1_DIR | 29 | 30 | Ch2_DIR |
| Ch1_BRK | 31 | 32 | Ch2_BRK |
| Ch1_TMP | 33 | 34 | Ch3_TMP |
| GND | 35 | 36 | GND |
| NOC | 37 | 38 | NOC |
| CAN_GND | 39 | 40 | CAN_GND |

| Left | Pin | Pin | Right |
|---|---|---|---|
| STRB* | 1 | 2 | D0 |
| RD* | 3 | 4 | D1 |
| WE* | 5 | 6 | D2 |
| R/W | 7 | 8 | D3 |
| IS* | 9 | 10 | D4 |
| A0 | 11 | 12 | D5 |
| A1 | 13 | 14 | D6 |
| A2 | 15 | 16 | D7 |
| A3 | 17 | 18 | A15 |

FIG. 3

FLEXIBLE AND COMPACT MOTOR CONTROL MODULE BASED ON THE CAN COMMUNICATION NETWORK

BACKGROUND OF THE INVENTION

The present invention relates to a flexible and compact motor control module based on the Controller Area Network (CAN). More specifically, the present invention relates to a motor control module which is based on the ISO11898 standard Controller Area Network (CAN), recognized for its suitability in the communication of intelligent sensors and actuators, and also capable of obtaining the location, speed and torque control commands of a motor and executing digital control functions irrespective of motor's type and power consumption, transmitting feedback data.

In the conventional design and manufacturing of microprocessor based control module for driving motors being essential for factory automation system, a separate control module is designated for each motor according to its power consumption and its type. Most of the higher level interfaces for control modules are consisted of parallel ports or one to one serial ports suitable for central control.

Accordingly, the number of wiring between driving mechanism and control module increases substantially for an integrated control of a plurality of motors and subsequently causes some difficulties for the repair and maintenance of the control system.

Also, even if a bus type serial communication is possible between the higher-level interfaces of each control module type, many difficulties in the system control arise due to the differences between each of the protocols. For the motor control module including to above functions, often the large size of the control module impairs an effective use of available space.

SUMMMARY OF THE INVENTION

The present invention is designed to overcome the above problems of prior arts. One object of the invention is to provide a motor control module based on the CAN which is capable of flexibly controlling various types of motors by distinguishing the essential DSP/CAN module and motor driving module for motor control and replacing only the programs for the essential DSP/CAN module and motor driving module according to their types and characteristics.

Another object is to provide a motor control module based on the CAN which is not only capable of installing an integrated distributed control system with simple attachment/detachment of the essential DSP/CAN module and motor driving module without the need to replace the power amplifier for the automation line comprising a plurality of motors, but also capable of significantly reducing the number of wiring and space wastage for the automation line, by implementing the essential DSP/CAN module and motor driving module in small size.

A further objective of the invention is to provide a motor control module based on the CAN which is capable of improving the cost savings and promoting the system openness for the PC based integrated motor control as well as simplifying the repair and maintenance, by adopting Controller Area Network which is the ISO11898 standard and has a rich PC interfaces as a higher level communication method for a motor control module.

BRIEF DESCRIPTION OF THE DRAWINGS

FIG. 2 is a configuration diagram of the connector pin J1 between the essential DSP/CAN module and motor driving module.

FIG. 3 is a configuration diagram of the connector pin J2 between the essential DSP/CAN module and motor driving module.

Description of the Numeric on the Main Parts of the Drawings

A: DSP/CAN Essential Module
B: Motor Driving Module
B1: Flexible Servo Drive Module
B2: DC Servo Drive Module
C: Control module
J1, J2: Connectors
M: Motor
PWM Amp: Power Amplifier
10: DSP
12: CAN Driver
14: RS232C Driver
16: Program RAM
18: Data RAM
20: MAC ID Selection Switch
30: Separate Power Source Transducer
32: Encoder
4: Driving Output
36: Pulse Counter
42: Address Decoder Circuit
44: Dip Switch
46: CAN Twisted-Pair line
48: Serial Socket
52: 24V Output
54: 5V Output
56: M-5V Output
58: 24V Input
60, 62: Digital Input
64: Motor Output

DETAILED DESCRIPTION OF THE EMBODIMENTS

In order to achieve the previously stated objectives, the present invention selects the distributed serial communication CAN of the ISO11898 standard as higher interfaces for the motor control module. The distributed control system configuration is recognized for its efficiency with regards to the supervisory control of a factory automation system consisted of a plurality of motors. The present invention provides a small-sized digital motor control module based on the dedicated motor control DSP (Digital Signal Processor) that allows an easy detachment/attachment and repair/maintenance. The present invention also provides a flexible motor driving module capable of digital control and communication, suitable even for the motors located on the conventional automation lines, irrespective of their types and power consumption.

Hereinafter, the present invention will be described in detail with reference to the drawings available from FIG. 1 to FIG. 7.

First, the following describes the general principle of motor control. In order to control motor M in FIG. 4, a control module, motor and appropriate Power Amplifier (PWM Amp) suitable for the motor capacity are required. The control module C calculates the appropriate control amount for the given purpose based on the signals from the encoder of the motor M. The control amount calculated from the control C is converted to the corresponding Pulse Width Modulation (PWM) signals and is transferred to the power amplifier (PWM Amp). The Power Amplifier (PWM Amp), based on the PWM signals received from the control module C, transfers the corresponding power to the motor M in order to operate the motor M. Again the motor M transmits the encoder signals to the control module C and repeats the whole process continuously for the control.

Figure 1:
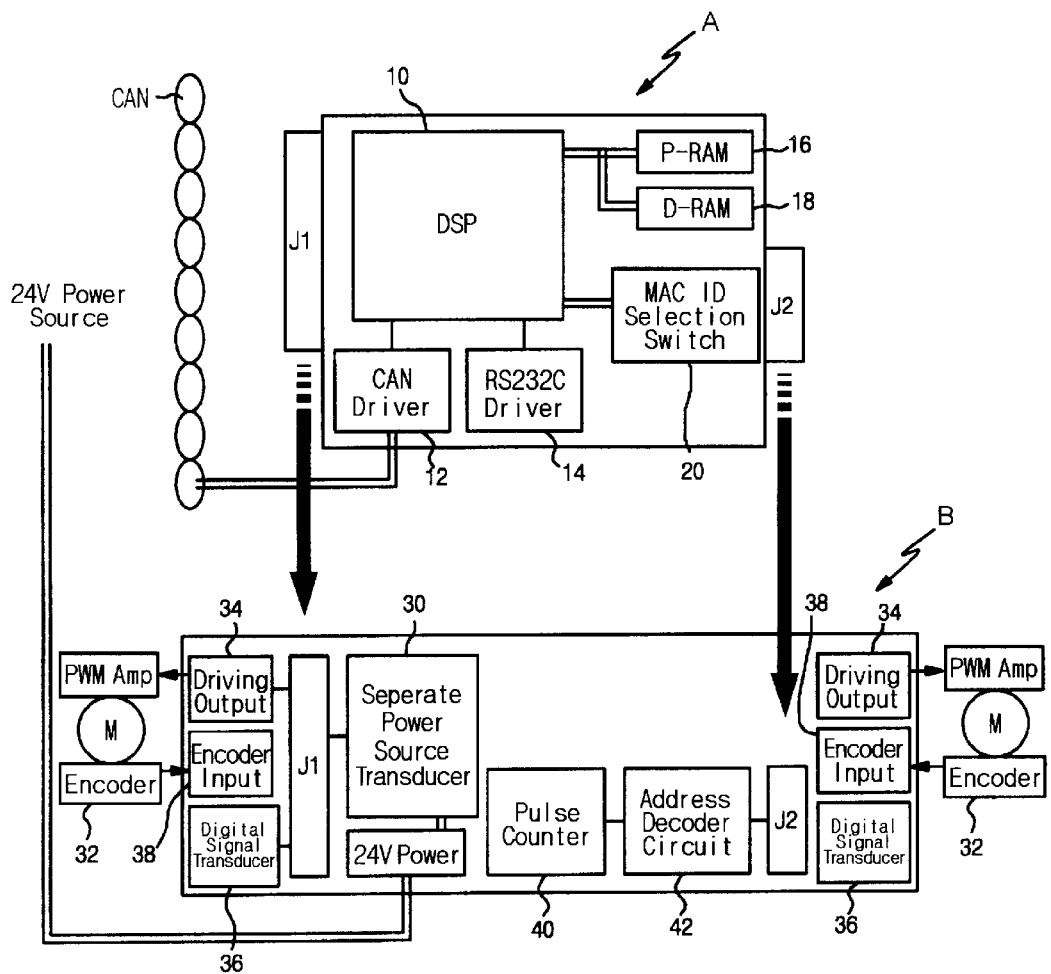
FIG. 1 is a configuration diagram of the motor control module according to the present invention.
Figure 4:
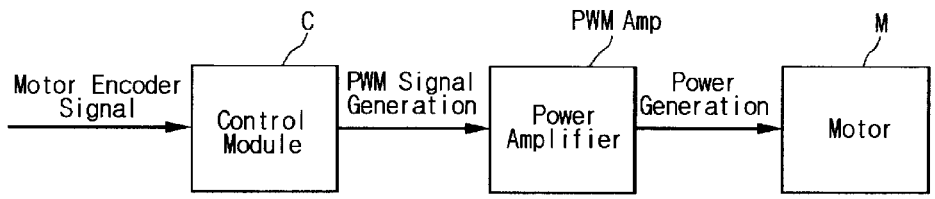
FIG. 4 is a diagram representing the general principle of motor control.

FIG. 1 illustrates the configuration of a flexible motor control module according to the present invention taking the operation of a server motor M with 2 axes.

The basic configuration of the present invention comprises, a dedicated motor control DSP 10 with an in-built CAN control module, a program RAM 16 where the necessary program for motor control is stored and a data RAM 18 where the necessary data for motor control is stored, a CAN driver 12 that connects said CAN with DSP 10 via RS232C communication network, an essential DSP/CAN module A consists of a Medium Access Control (MAC) ID selection switch 20 that designates the nodes on the network to be used into binary number, a separate power source transducer 30 where said essential DSP/CAN module A is loaded through the connectors J1,J2 and transforms 24V main power source into 5V power source separately for the purpose of communication/motor/processor, a driving output 34 which outputs power in connection with the motor M and power amplifier (PWM Amp) to be controlled, an encoder input 38 that inputs codes into the encoder 32 which is connected to the motor M, a motor driving module B consisted of a digital signal transducer 36 that transforms digital input/output signals.

The present invention is based on CAN of the ISO11898 standard recognized for its suitability in the communication of intelligent sensors and actuators. At the beginning, CAN was developed for controlling various sensors and instruments while being installed inside of a car, however, its application has been extended to the computer integrated manufacturing system and FA system from the second half of the 90s. As with the functional upgrades, CAN is firmly establishing itself as the network that is capable of integrating all the necessary manufacturing information from the manufacturing lines for the automation system.

With the added advantages in improving stability of the manufacturing lines, CAN is capable of reducing the system mal-functions arising from the complex wiring therefore resulting a significant cost reduction. It can be used as an intelligent network that can control and self-diagnose the local instruments through industrial PCs due to its reliability and speedy processing based on priority. Also, a real time control is possible since it can communicate with the control module and local instruments through a single wiring.

For example, if the input/output signals directly from the local instruments were to be used, several dozen wiring were required previously, however, CAN can realize the distribution and management control of the local instruments with only two lines like the telephone lines.

The DSP/CAN essential module A based on CAN takes the form of a piggyback type where it is loaded on the motor driving module B through the connectors J1, J2. The DSP/CAN essential module A together with the motor driving module B takes the role of the control module C in FIG. 4. For DSP 10 of the dedicated motor control processor with an in-built CAN control module, the present invention uses TMS320F243. DSP 10 performs arithmetic operations on the digital data obtained from the conversion of the analogue signals and processes the signals through filtering or spectrum analysis. In the program RAM 16 or data RAM 18 connected to DSP 10, the program and data necessary for the motor control are stored.

Figure 5:
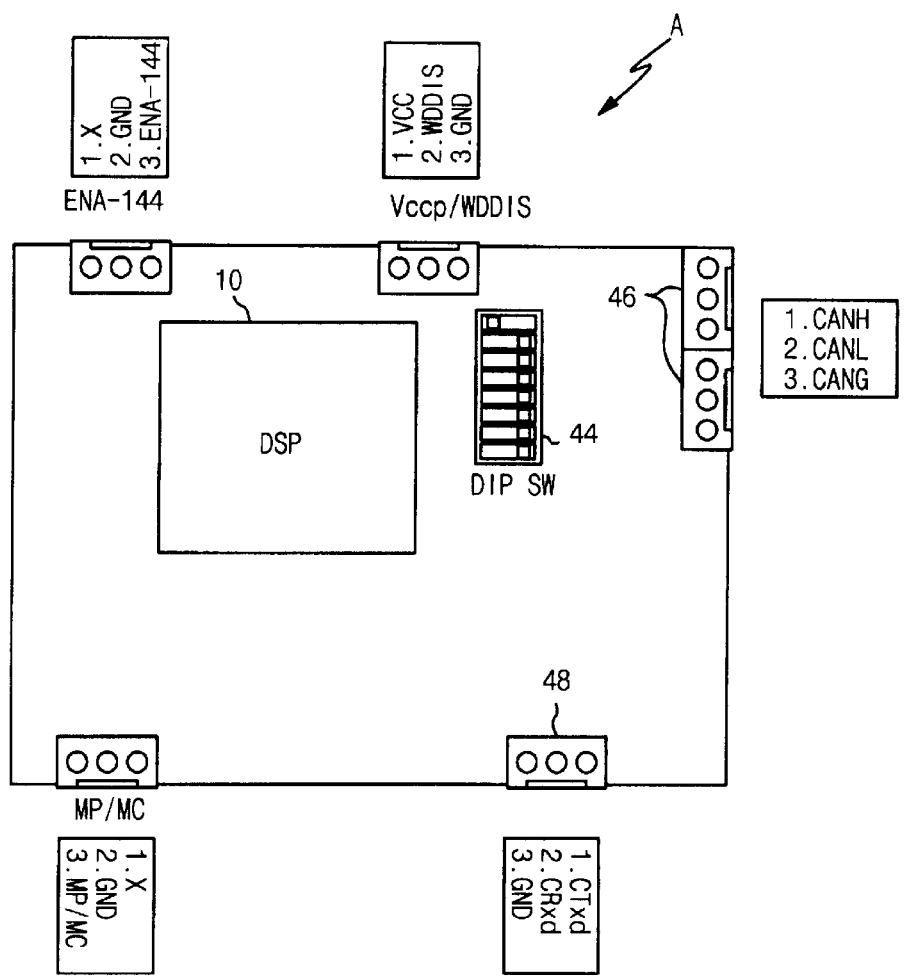
FIG. 5 illustrates the type and location of the connection pins of the DSP/CAN essential module according to the present invention.

MAC ID select switch 20 determines a network ID in the CAN for the purpose of transmitting high-speed data. In FIG. 5, the CAN twisted-pair lines 46 are the connection pins for the DSP/CAN essential module A, and the serial socket 48 is for RS232C. Also, the DIP-switch 44 determines the operational modes of DSP 10. The separate power source transducer 30 in the motor driving mode B transforms 24V main power source into 5V power source separately for the purpose of communication/motor/processor. The driving output 34 outputs motor drive signals in connection with the motor M and power amplifier (PWM Amp) to be controlled. The encoder input 38 inputs phase signals from the encoder 32, which is connected to the motor M. The digital signal transducer 36 transforms digital input/output signals. The encoder pulse counter 40 and the address decoder circuit 42 are embedded in DSP 10.

The motor driving module B can be separated into a Flexible Servo Drive Module B1 when an external amplifier is to be used and a DC Servo Drive Module B2 for the operation of a small motor.

Figure 6:
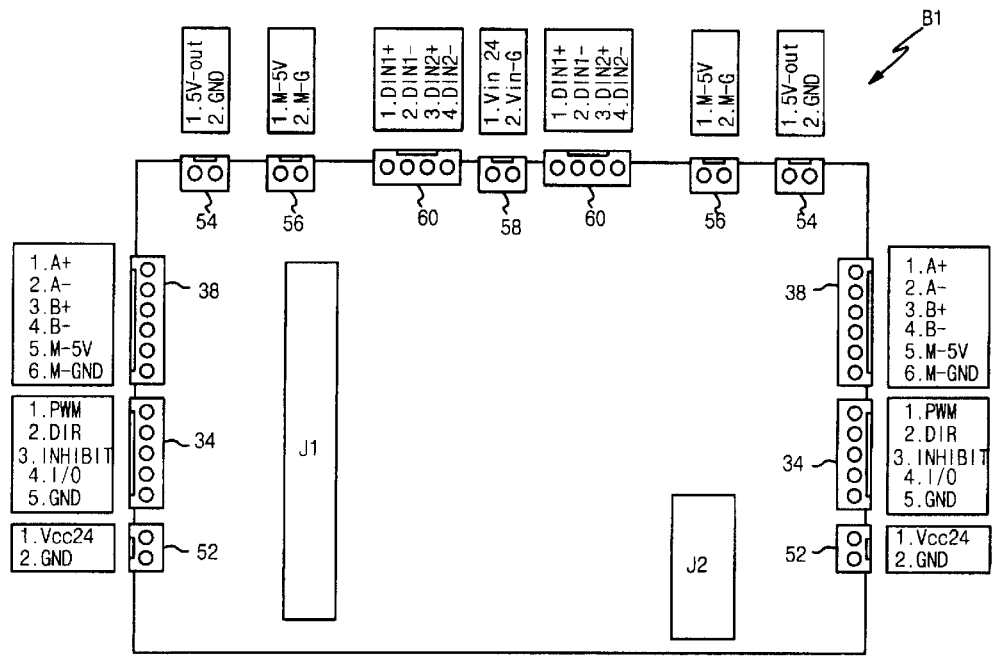
FIG. 6 illustrates the type and location of the connection pins of the Flexible Servo Drive Module according to the present invention.

The structure of Flexible Servo Drive Module B1 in FIG. 6 has an encoder input 38 and operation output 34 and more specifically comprises 24V an input 58, 24V output 52 and 5V output 54 for outputting sensing data, M-5V output 56 and digital input 60 for inputting sensing data.

Figure 7:
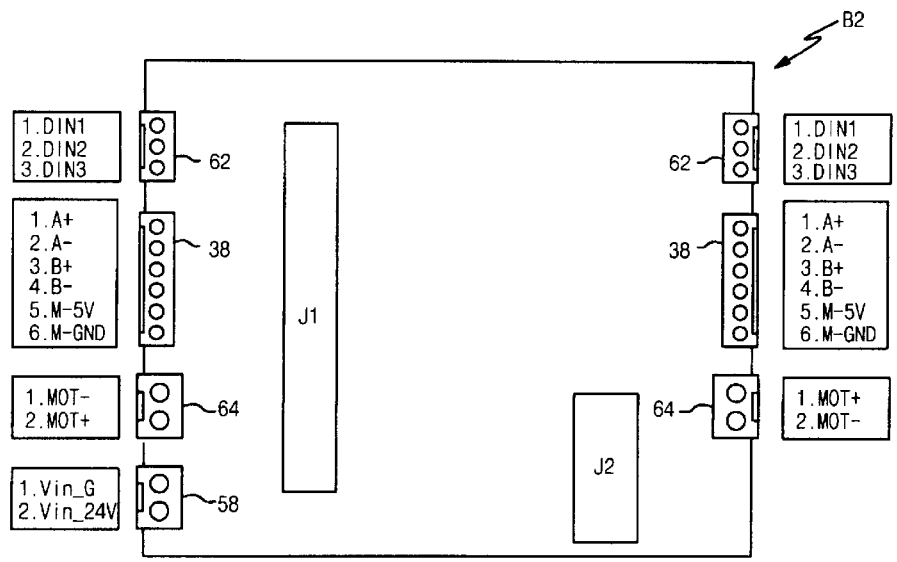
FIG. 7 illustrates the type and location of the connection pins of the DC Servo Drive Module according to the present invention.

The DC motor driving module B2 in FIG. 7 is a module that widely used for driving small motors with the capacity below 75 Watt such as a robotic system and comprises an in-built small amplifier. The encoder signals from the motor M are inputted to the driving module B2 and the power is outputted from the motor. The DC motor driving module B2 is constructed by combining a control module and 75W DC motor amplifier. The digital input 62 and the motor output 64 are not shown in FIG. 7. The DSP/CAN essential module A and motor driving module B are connected by the connectors J1, J2 whereas FIG. 2 and FIG. 3 represent the signal type and number for the connectors J1, J2.

The connector J1 where the signals related to the driving of the motor M is usually allocated comprises CAN, 5V power source pins of DSP (p1, p2), (p39, p40), (p15, p16), (p35, p36), 8 channel A/D conversion input pins (p3–p10), motor driving pins with 2 axis (p27, p28, p1, p12) and feedback signal pins (p17–p26, p29–p34).

The connector J2 comprises 5 bit address pins (p11, p13, p15, p17, p18), 8 bit data bus pins (p2, p4, p6, p8, p10, p12, p14, p16) and 5 bit bus control pins (p1, p3, p5, p7, p9).

The connectors J1 and J2, provide the signal input/output flexibility of the driving module.

According to the present invention, a flexible control of various types of motors is possible by distinguishing the essential DSP/CAN module and motor driving module for motor control, therefore being able to replace only the programs of the essential DSP/CAN module and/or motor driving module according to the types and characteristics of the motors. Also, according to the present invention, an Integrated Distributed Control System can be installed by implementing the essential DSP/CAN module and motor driving module within 6 cm×10 cm×3 cm space and being able to simply attach/detach the essential DSP/CAN module and motor driving module without replacing the power amplifier in an automation line which comprises a plurality of motors. Further, the present invention is capable of significantly reducing the number of wiring and space wastage for the automation line by locating the proposed controller in the near of actuators.

Finally, the present invention contributes towards the openness in the Integrated Motor Control based on PC as well as the minimization in cost and repair/maintenance by adopting CAN which is the ISO11898 standard and has a rich PC interfaces as a higher-level communication method for a motor control module.

What is claimed is:

1. A motor control module based on a CAN (Controller Area Network) communication network comprising:
    an essential DSP/CAN module comprising
        a dedicated motor control DSP (Digital Signal Processor) with a built-in CAN control module;
        a program RAM where a program for motor control is stored and a data RAM where data for motor control is stored;
        a CAN driver that connects the CAN with said dedicated motor control DSP via RS232C communication network;
        a Medium Access Control (MAC) ID selection switch that designates a binary number node address on the network; and
        a couple of first connectors;
    a motor driving module comprising
        a digital signal transducer that transforms digital input/output signals;
        a couple of second connectors that connect to the couple of first connectors;
        a power source transducer which is connectible to said essential DSP/CAN module through the couple of second connectors and transforms a 24V main power source into a plurality of 5V power sources provided for one of communication, motor operation and processor operation, respectively;
        a driving output which outputs power in connection with a motor and a power amplifier to be controlled; and
        an encoder input that inputs phase signals from an encoder which is connected to the motor.

2. The motor control module according to claim 1, wherein said essential DSP/CAN module is loaded onto said motor driving module in piggyback configuration.

3. The motor control module according to claim 1, wherein first one of said second connectors comprises a plurality of 5V power source pins of said dedicated motor control DSP and said CAN, a plurality of 8 channel A/D conversion input pins, a plurality of motor driving pins with two axes and a plurality of feedback signal pins.

4. The motor control module according to claim 3, wherein a second one of said second connectors comprises a plurality of 5 bit address pins, a plurality of 8 bit data bus pins and a plurality of 5 bit bus control pins.

5. The motor control module according to claim 1, wherein said essential DSP/CAN module comprises a plurality of connection pins that comprises a plurality of CAN twisted-pair lines, a serial socket for RS232C and a dip switch which determines operational modes of the DSP.

6. The motor control module according to claim 1, wherein said motor driving module has the encoder input and the driving output, and further comprises a 24V input, a 24V output and a 5V output for outputting sensing data, a M-5V output and a digital input for inputting sensing data.

7. The motor control module according to claim 1, wherein said motor driving module comprises a DC motor driving module which comprises a control module combined with a 75W DC motor amplifier.

8. The motor control module according to claim 2, wherein said essential DSP/CAN module comprises a plurality of connection pins that comprises a plurality of CAN twisted-pair lines, a serial socket for RS232C and a dip switch which determines operational modes of the DSP.

9. The motor control module according to claim 2, wherein said motor driving module has the encoder input and the driving output, and further comprises a 24V input, a 24V output and a 5V output for outputting sensing data, a M-5V output and a digital input for inputting sensing data.

10. The motor control module according to claim 2, wherein said motor driving module comprises a DC motor driving module which comprises a control module combined with a 75W DC motor amplifier.

11. A motor control module based on a CAN communication network, comprising:
    an essential DSP/CAN module comprising:
        a dedicated motor control DSP with a built-in CAN control module;
        a CAN driver that connects the CAN with the dedicated motor control DSP via RS232C communication network;
        a Medium Access Control ID selection switch that designates a node address on the network; and
        a couple of first connectors; and
    a motor driving module comprising:
        a couple of second connectors that connect to the couple of first connectors;
        a power source transducer that is connectible to the essential DSP/CAN module though the couple of second connectors, the power source transducer transforming a first voltage main power source into a plurality of second voltage power sources provided for one of communication, motor operation and processor operation;
        a driving output that outputs power in connection with a motor and a power amplifier to be controlled; and
        an encoder input that inputs phase signals from an encoder connected to the motor.

12. The motor control module according to claim 11, wherein the essential DSP/CAN module is loaded onto the motor driving module in piggyback configuration.

* * * * *

UNITED STATES PATENT AND TRADEMARK OFFICE
CERTIFICATE OF CORRECTION

PATENT NO. : 6,731,089 B2
DATED : May 4, 2004
INVENTOR(S) : Young Jo Cho et al.

It is certified that error appears in the above-identified patent and that said Letters Patent is hereby corrected as shown below:

<u>Column 6,</u>
Line 50, "though" should be -- through --.

Signed and Sealed this

Twenty-first Day of December, 2004

JON W. DUDAS
*Director of the United States Patent and Trademark Office*